United States Patent
Verma

(10) Patent No.: US 8,391,543 B1
(45) Date of Patent: Mar. 5, 2013

(54) METHOD AND APPARATUS FOR PREVENTING DATA LEAKAGE FACILIATED BY STEGANOGRAPHY

(75) Inventor: Amit Verma, Uttar Pradesh (IN)

(73) Assignee: Symantec Corporation, Mountain View, CA (US)

( * ) Notice: Subject to any disclaimer, the term of this patent is extended or adjusted under 35 U.S.C. 154(b) by 807 days.

(21) Appl. No.: 12/210,242

(22) Filed: Sep. 15, 2008

(51) Int. Cl.
- *G06K 9/00* (2006.01)
- *B42D 15/00* (2006.01)
- *H04N 1/40* (2006.01)
- *G09C 3/00* (2006.01)
- *H04L 9/32* (2006.01)

(52) U.S. Cl. ......... 382/100; 283/113; 358/3.28; 380/54; 713/176

(58) Field of Classification Search .............. 382/100
See application file for complete search history.

(56) References Cited

U.S. PATENT DOCUMENTS

| | | | |
|---|---|---|---|
| 2001/0044899 A1* | 11/2001 | Levy | 713/176 |
| 2007/0140524 A1* | 6/2007 | Kumar et al. | 382/100 |
| 2008/0126807 A1* | 5/2008 | Choi et al. | 713/176 |

OTHER PUBLICATIONS

Paul, Goutam ; Mukherjee, Imon: "Image Sterilization to Prevent LSB-based Steganographic Transmission." in: CoRR, abs/1012.5573 (2010).*

"Extracting data embedded with JSteg," Feb. 18, 2004, downloaded from web site http://www.guillermito2.net/stegano/jsteg/index.html on Aug. 18, 2008.

"Hide and Seek: An Introduction to Steganography," Published by the IEEE Computer Society, IEEE Security & Privacy, May/Jun. 2003, pp. 32-44.

* cited by examiner

*Primary Examiner* — Bhavesh Mehta
*Assistant Examiner* — Nirav G Patel
(74) *Attorney, Agent, or Firm* — Wilmer Cutler Pickering Hale and Dorr LLP

(57) ABSTRACT

A method and apparatus for preventing data leakage facilitated by steganography is provided. In one embodiment, the method for preventing data leakage caused by steganography without perceptual quality degradation comprises processing content being transmitted from a computer, wherein the content comprises steganographic data; and before the transmission, modifying the steganographic data to corrupt hidden information within the content without perceptual quality degradation.

20 Claims, 3 Drawing Sheets

METHOD AND APPARATUS FOR PREVENTING DATA LEAKAGE FACILIATED BY STEGANOGRAPHY

BACKGROUND

1. Field of the Invention

Embodiments of the present invention generally relate to techniques for preventing data leakage and, more particularly, to a method and apparatus for modifying a carrier to disrupt secret message transmission and prevent data leakage that is facilitated by steganography.

2. Description of the Related Art

Content (e.g., images, sound, video, and the like) has become popular within the Internet community. The proliferation of the multimedia content, however, has paved a way for data leakage problems within organizations (e.g., corporations, government agencies, universities and/or the like). For example, steganography involves the use of various forms of the content as carriers to leak data (e.g., engineering specifications, blueprints, financial information, privileged information, structural designs, source code, trade secrets, formulae, defense plans and the like). In steganography, the hidden data or message is merged with the content data (e.g., pixel values, motion vectors, audio data, color information, coefficients and/or the like).

Sometimes, the carrier includes data (e.g., redundant bits) on which a sequence of bits (i.e., hidden data) may be transmitted with little or no chance of detection and without a noticeable loss in perceptual quality (i.e., most human cannot pickup certain differences in luminance and color). In an image, for example, one or more less significant bits of time domain samples or transform domain coefficients may be used to transmit the hidden data. Similarly, redundant audio data may also be used to leak data. Sometimes, the carrier may be transmitted as an attachment to an inconspicuous message from the organization to an external computing device.

Occasionally, a person (e.g., a hacker, a disgruntled employee of the organization and/or the like) utilizes a steganographic technique to leak the confidential data. During a phishing attack, hackers may utilize steganography to embed the stolen credentials in the multimedia content and publish it on public bulletin boards to evade detection. Furthermore, terrorists may hide information in the multimedia content by utilizing steganography for communication.

Current steganographic techniques replace one or more portions of the content data with the confidential data. Such steganographic techniques use one or more less significant bits of time domain or coefficient of transform domain as carrier to hide data. However, current statistical and artificial intelligence based steganography detection techniques are computationally expensive. In addition, the current steganography detection techniques have a high rate of false positives which limits the usefulness of such detection techniques within enterprise Data Leakage Prevention (DLP) solutions.

Accordingly, there is a need in the art for a method and apparatus for preventing data leakage caused by a steganographic technique.

SUMMARY OF THE INVENTION

Embodiments of the present invention comprise a method and apparatus for preventing data leakage facilitated by steganography. In one embodiment, a method for preventing data leakage caused by steganography without perceptual quality degradation comprises processing content being transmitted from a computer, wherein the content comprises steganographic data; and before the transmission, modifying the steganographic data to corrupt information that may be hidden within the content without perceptual quality degradation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
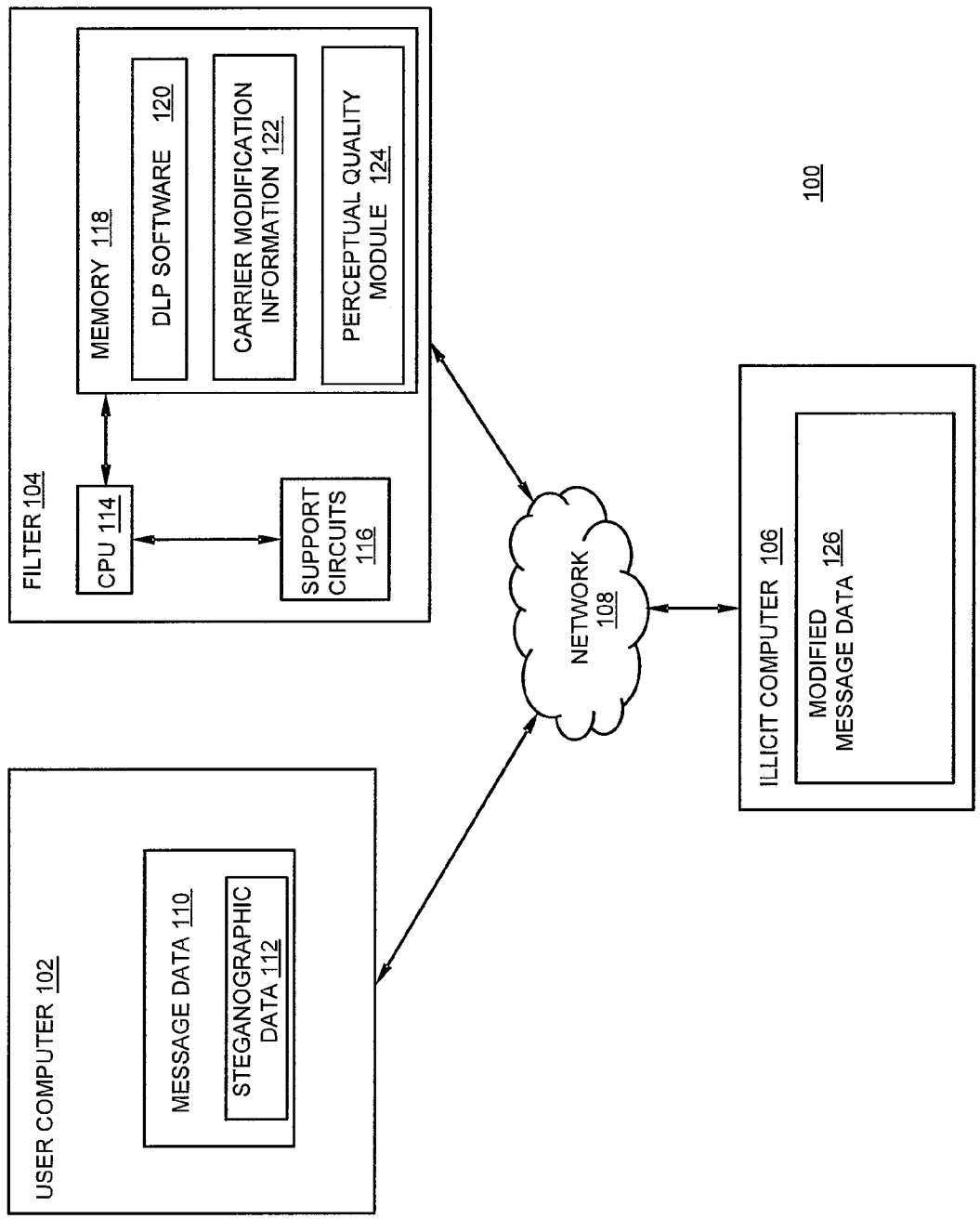
FIG. 1 is a block diagram of a system for modifying a carrier to prevent data leakage caused by a steganographic technique in accordance with one or more embodiments of the present invention.

FIG. 1 is a block diagram of a system 100 for modifying a carrier to prevent data leakage according to one or more embodiments. The system 100 comprises a user computer 102, an illicit computer 106 and a filter 104, coupled to each other through a network 108.

The user computer 102 is a type of computing device (e.g., a laptop, a desktop, a Personal Digital Assistant (PDA)), such as those generally known in the art. The user computer 102 may be used by a computer to communicate various forms of content, such as content 110, to one or more computers through the filter 104. As such, the user computer 102 is the source of any hidden information that is leaked through steganography. The content 110 includes steganographic data 112, which may be defined as one or more portions (e.g., bits) of the content 110 that may be modified (e.g., replaced with confidential information) with a minimal loss in perceptual quality. For example, the steganographic data 112 may include one or more redundant bits (e.g., less significant bits) associated with the content 110 (e.g., pixel values, transform coefficients (e.g., quantized direct cosine transform coefficients), spatial structures, color tables and/or the like).

The filter 104 is a type of hardware device (e.g., a laptop, a desktop, a Personal Digital Assistant (PDA), a router, a switch and/or the like), such as those generally known in the art. The filter 104 is configured to modify a carrier to corrupt any hidden information beyond recognition. The filter 104 includes a Central Processing Unit (CPU) 114, various support circuits 116, and a memory 118. The CPU 114 may comprise one or more commercially available microprocessors or microcontrollers that facilitate data processing and storage. The support circuits 116 facilitate the operation of the CPU 114 and comprise at least one of clock circuits, power supplies, cache, input/output circuits, and the like. The memory 118 comprises at least one of Read Only Memory (ROM), Random Access Memory (RAM), disk drive storage, optical storage, removable storage, and the like. The memory 118 includes various software packages, such as data leakage prevention software 120 and a perceptual quality module 124. The memory further includes various data, such as carrier modification information 122.

The network 108 comprises a communication system that connects a computer system by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure, such as Ethernet, WiFi, WiMax, General Packet Radio Service (GPRS), and the like.

The illicit computer 106 is a type of computing device (e.g., a laptop, a desktop, a Personal Digital Assistant (PDA)), such as those generally known in the art. In one embodiment, the illicit computer 106 is an intended recipient of the content 110. In another embodiment, the illicit computer 106 may be utilized by a hacker (e.g., a terrorist, a phisher, a spy and the like) with an intention to steal information through a steganographic technique. The stolen information may be hidden within the steganographic data 112. As explained further below, the application of the various embodiments of the present invention corrupt the steganographic data 112 and destroy any hidden information. As such, the illicit computer 106 receives modified content 126 with corrupted hidden information. In other words, the modified content 126 does not include a retrievable version of any hidden information.

According to various embodiment of the present invention, the content 110 includes image data, audio data, video data and the like. The steganographic data 112 includes data (e.g., redundant bits) that may be modified with a minimal loss in perceptual quality associated with the content. In one embodiment, a user of the user computer 102 utilizes a steganographic technique to hide information within the redundant data as the steganographic data 112. The information hidden within the steganographic data 112 may include various data, such as engineering specifications, chemical formulae, confidential information, source code, trade secrets, defense plans and the like.

According to various embodiments of the present invention, the carrier modification information 122 indicates one or more portions of the steganographic data 112 that may be modified without perceptual quality degradation. After the modification, the modified content 126 has very little, if any, loss in perceptual quality. The carrier modification 122 indicates an acceptable (i.e., minimal) perceptual quality for the content 110. In one embodiment, the carrier modification information 122 is used to determine one or more bits (e.g., Less Significant Bits, randomly selected bits and/or the like) that may be modified in order to corrupt the steganographic data 112 within the content 110. For example, a number of pixels are computed from an acceptable Peak Signal to Noise Ratio (PSNR) value for an image where less significant bits within the number of pixels are to be modified in order to destroy any hidden information.

The carrier modification information 122 may be generated through experimentation with numerous forms of content according to one embodiment. For example, the carrier modification information 122 may be based upon acceptable Peak Signal to Noise Ratio (PSNR) values for numerous images. In one embodiment, an acceptable PSNR value indicates a number of bits of redundant data within the content 110 that is to be modified in order to corrupt the steganographic data 112 without perceptual quality degradation. Perceptual quality degradation may be defined as a minimal (i.e., a noticeable) loss in perceptual quality. In one embodiment, a pre-defined threshold may be a range of PSNR values that are not associated with perceptual quality degradation between original and modified versions of the numerous images.

In one embodiment, the perceptual quality module 124 determines a difference in perceptual quality between the content 110 and a modified version of the content 110. In one embodiment, a PSNR value represents the extent to which the original version of the image differs from the modified version of the image. Generally, a PSNR value is an engineering term for the ratio between the maximum possible power of a signal and the power of corrupting noise that affects the fidelity of its representation. In one embodiment, the PSNR value is computed using a mean square error value (MSE). The mean square value is the sum of the square of the differences between values for the content (e.g., pixel values of an image) and the modified version of the content (e.g., pixel values for the modified version of the image) that is further divided by a size of the image (e.g., image pixel height multiplied by image pixel width). Then, a maximum value for the content (e.g., 255 for an image if each pixel is eight bits) is divided by a square root of the MSE to produce an intermediate value. Finally, a logarithm of the intermediate value is multiplied by twenty to produce the PSNR value that is expressed in terms of a logarithmic decibel (dB) scale as explained further below.

According to various embodiments of the present invention, the perceptual quality module 124 computes a Peak Signal to Noise Ratio (PSNR) value between an original and a modified version of the content 110. The computed PSNR value represents a perceptual quality of the content 110 after modification (i.e., an extent of perceptual quality loss between the original and the modified version of the content 110). Based on the computed PSNR value, the perceptual quality module 124 determines the perceptual quality degradation, if any, associated with the content after modification.

According to various embodiments of the present invention, the data leakage prevention software 120 prevents the undesired disclosure of confidential information that may be hidden within the steganographic data 112 associated with the content 110 through a steganographic technique. In one embodiment, the data leakage prevention software 120 modifies the steganographic data 112 to destroy or corrupt any hidden information. In one embodiment, the data leakage prevention software 120 analyzes the carrier modification information 122 to determine a number of bits to modify (e.g., flip) without perceptual quality degradation of the content. For example, the data leakage prevention software 120 accesses the carrier modification information 122 and selects one or more pre-determined PSNR values, which may be used to compute the number of bits of the redundant data (e.g., the carrier) to modify with little or no noticeable loss in perceptual quality.

In another embodiment, the data leakage prevention software 120 modifies the steganographic data 112 by randomly changing a number of less significant bits (e.g., a Least Significant Bit (LSB)) of the redundant data. After the modification, the data leakage prevention software 120 compares the PSNR value (i.e., a measurement of perceptual quality) with the carrier modification information 122 to determine whether the modified version of the content is to be transmitted. For example, if the PSNR value is within an acceptable range of PSNR values, then there is a strong likelihood that any hidden information is corrupted and the modified content 126 has little or no perceptual quality loss. Therefore, the modified version of the content may be transmitted to the illicit computer 106. As another example, if the PSNR value exceeds each and every acceptable PSNR value, then one or more additional bits may need to be modified in order to corrupt the steganographic data 112 without perceptual quality degradation. As yet another example, if the PSNR value falls below each and every acceptable PSNR value, then the steganographic data 112 may need to modified with one or more fewer bits in order to maintain an acceptable (i.e., minimal) perceptual quality.

In another embodiment, the data leakage prevention software 120 cooperates with the perceptual quality module 124 and the carrier modification information 122 to filter the content 110 being transmitted from the user computer 102 to the illicit computer 106. In one embodiment, the data leakage prevention software 120 determines one or more bits of the steganographic data 112 that may be modified based on an acceptable PSNR value. The data leakage prevention software 120 utilizes the perceptual quality module 124 and the carrier modification information 122 to determine an extent to which the steganographic data 112 may be modified (i.e., an extent of perceptual quality loss) such that any hidden information is corrupted and destroyed. In another embodiment, the data leakage prevention software 120 adds noise (e.g., Gaussian noise) to modify the steganographic data 112 within the content 110 where any hidden information is beyond recovery. As a result, the modified content 126 is communicated to the illicit computer 106 with little or no loss in perceptual quality of the content after modification.

As an example and not as a limitation, the user of the user computer 102 may wish to communicate hidden information (e.g., engineering specifications, source code, trade secrets, defense plans and the like) to an illicit computer 106. The user of the user computer 102 may utilize steganography to hide such information within an image that is attached to an email. The filter 104 prevents any potential data leakage by modifying the image attached to the email (e.g., redundant data associated with the image) such that any hidden information is corrupted and/or destroyed with a minimal perceptual quality loss.

In one embodiment, the data leakage prevention software 120 determines a number of bits that may be changed in order to corrupt any information hidden in the image based upon acceptable PSNR values that are pre-determined to most likely result in no perceptual quality degradation. In one embodiment, the perceptual quality of an image is allowed to degrade within a pre-defined threshold of an acceptable PSNR value. As an example and not as a limitation one or more Least Significant Bits (LSBs) of the image are to be modified to create a modified version of the image with a PSNR value that is between two or more pre-determined PSNR values, such as fifteen dB (decibels) and twenty-five dB. As mentioned above, the PSNR value is computed between the image and the modified version of the image. Based on the computed PSNR value, the data leakage prevention software 120 prevents or permits the transmission of the email.

In addition, the hidden information may not be corrupted or destroyed if the computed PSNR value exceeds twenty-five dB. If the computed PSNR value exceeds twenty-five Db, then an insufficient number of bits were modified. Accordingly, the modified version of the content 110 should not be transmitted because there is a strong likelihood that the hidden information is not completely corrupted or destroyed. In one embodiment, a larger number or bits of the redundant data are to be modified in order to produce a PSNR value between fifteen dB and twenty-five dB.

There may be a noticeable difference in perceptual quality if the computed PSNR value falls below fifteen dB. If the computed PSNR value falls below fifteen Db, then an excessive number of bits were modified. In one embodiment, a smaller number of bits of the redundant data are to be modified. A policy associated with the data leakage prevention software 120 is used to determine an next action for the email (e.g., prevent or permit transmission, notify administrator, quarantine the email and/or the like). According to one embodiment, the modified version of the steganographic data 112 is not to be transmitted because there is a strong likelihood of perceptual quality degradation to some degree. For example, audio data attached to the modified version of the steganographic data 126 may have low perceptual quality because too many bits were modified (e.g., flipped). In one embodiment, a larger number or bits of the redundant data are to be modified in order to produce a PSNR value between fifteen dB and twenty-five dB.

If the computed PSNR value is within the pre-defined threshold of fifteen dB and twenty-five dB, then the modified steganographic data 126 may be transmitted because any information hidden through steganography has been corrupted with little or no perceptual quality degradation. Moreover, the corrupted steganographic data 128 is not usable at the illicit computer. Furthermore, the carrier modification information 122 is updated with the computed PSNR value and the number of less significant bits. In one embodiment, the perceptual quality module 124 uses a machine learning technique (e.g., Bayesian Classifier) to determine one or more acceptable PSNR values for modifying the redundant data within the steganographic data 112 without perceptual quality degradation.

Exemplary PSNR and MSE equations are listed below. The variables N and M refer to a width (e.g., pixel width) and a height (e.g., pixel height) of an image, respectively. B refers to a number of pixels in which less significant bits may be modified. $P_T$ refers an acceptable PSNR value according to one or more embodiments of the present invention. Each pixel is considered to have eight bits. Hence, a maximum pixel value is 255. It is appreciated that various embodiments of the present invention may employ different techniques for measuring perceptual quality of content (e.g., Perceptual Speech Quality Measure (PSQM) for voice data, Perceptual Audio Quality Measurement (PAQM) method for audio data, PSNR for video data and/or the like).

$$MSE = \frac{(1^2 + 1^2 + 1^2 + \ldots (B times))}{N \times M} = \frac{B}{NM}$$

$$10 \log_{10} \frac{255}{\sqrt{MSE}} > P_T$$

$$B < NM \left(\frac{255}{10^{0.1 P_T}}\right)^2$$

In reference to the exemplary equations mentioned above, if an acceptable PSNR value ($P_T$) is 25 dB and N=M=100, then B is computed to be 6502 pixels. In order to maintain a perceptual quality of 25 dB in a 100 pixel×100 pixel image, then Least Significant Bits of 6502 pixels may be modified without perceptual quality degradation. Subsequently, the 6502 (or less) pixels may be randomly chosen and modified. If $P_T$=30 dB (i.e., better perceptible quality), then B is computed to be 650. These equations may not be applicable if bits other than the Least Significant Bits are also modified in the signal.

Figure 2:
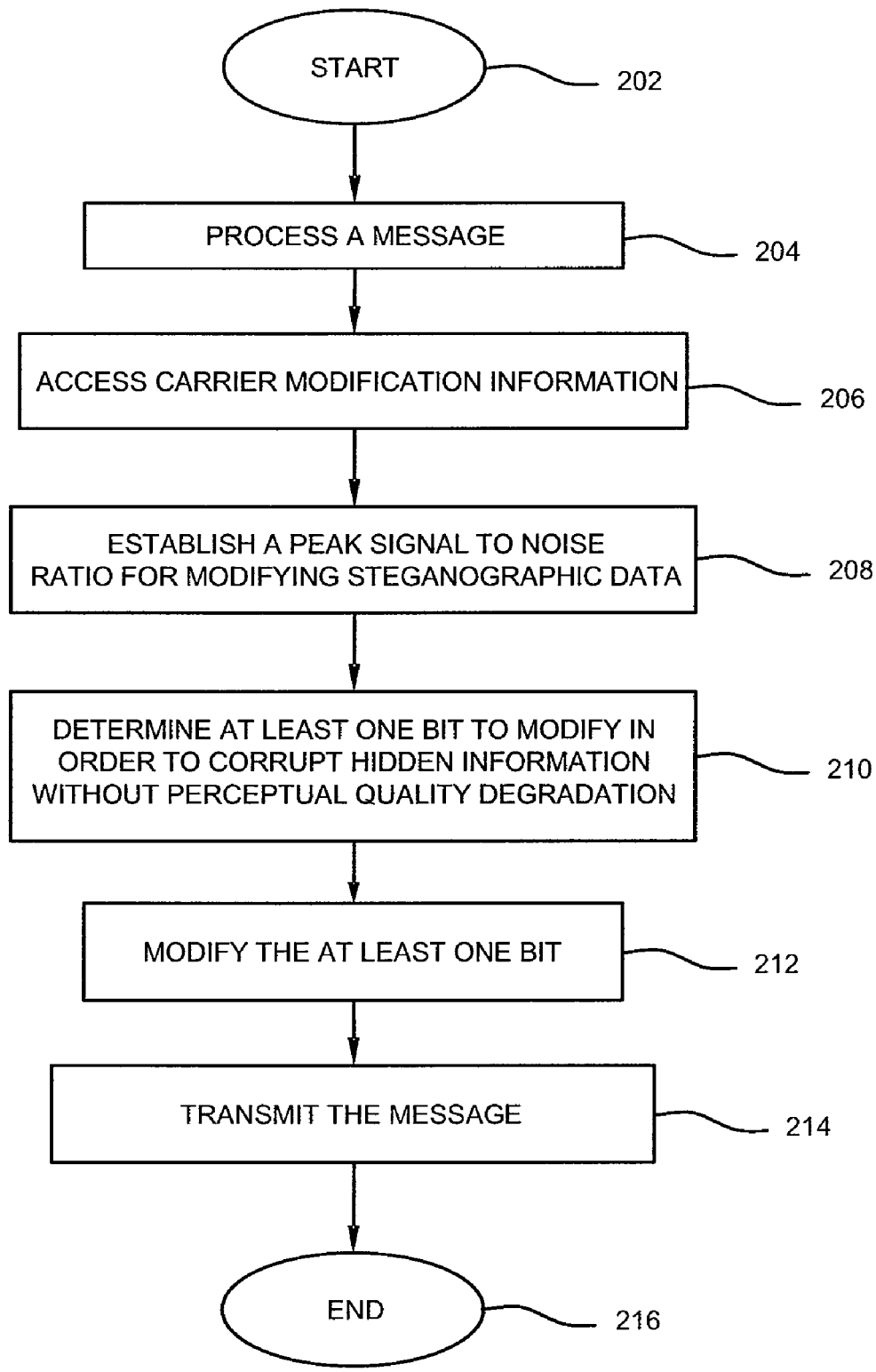
FIG. 2 is a flow diagram of a method for modifying a carrier to prevent data leakage caused by a steganographic technique in accordance with one or more embodiments of the present invention.

FIG. 2 is a flow diagram of a method 200 for modifying a carrier to prevent data leakage according to one embodiment.

The method 200 starts at step 202 and proceeds to step 204, at which a message is processed. The message includes content as an attachment. As explained above, the content includes steganographic data (e.g., the steganographic data 112 of FIG. 1).

At step 206, carrier modification information (e.g., the carrier modification information 122 of FIG. 1) is accessed. At step 208, a peak signal to noise ratio for modifying the steganographic data is established. At step 210, one or more bits to modify in order to corrupt any information hidden in the steganographic data without perceptual quality degradation are determined. At step 212, the one or more bits are modified. In one embodiment, the one or more less significant bits of the steganographic data are flipped. At step 214, the message is transmitted. The method 200 ends at step 216.

Figure 3:
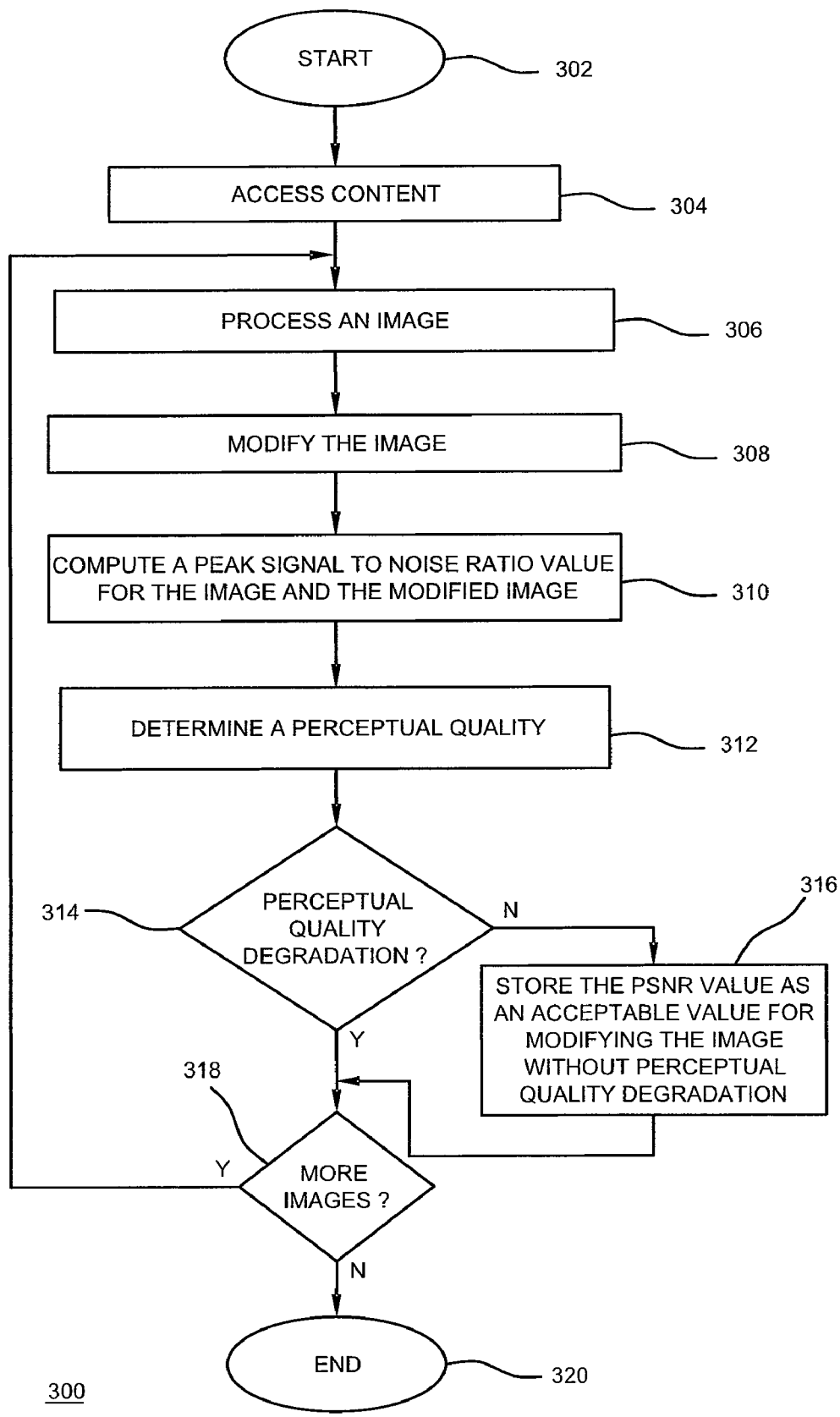
FIG. 3 is a flow diagram of a method to generate carrier modification information in accordance with one or more embodiments of the present invention.

FIG. 3 is a flow diagram of a method 300 for generating carrier modification information according to one embodiment. The method 300 starts at step 302 and proceeds to step 304, at which content is accessed. At step 306, an image is processed. At step 308, the image (e.g., pixel values) is modified. In one embodiment, one or more Less Significant Bits (LBSs) of the pixel values are randomly changed.

At step 310, a PSNR value for the image and the modified image is computed. At step 312, a perceptual quality based on the PSNR value is determined. At step 314, a determination is made as to there is perceptual quality degradation in the modified image. In one embodiment, a determination is made as to whether there is a noticeable loss in perceptual quality of the modified image. If, it is determined that there is no perceptual quality degradation in the modified image (option "NO") then the method 300 proceeds to step 316. At step 316, the PSNR value is stored as an acceptable value for modifying the image without perceptual quality degradation. For example, carrier modification information may indicate acceptable PSNR values. If the PSNR value is lower than each and every acceptable PSNR value, then there is perceptual quality degradation of the modified image. If the PSNR value is greater than one or more acceptable PSNR values, then there is no perceptual quality degradation.

If, at step 314 it is determined that there is perceptual quality degradation in the image (option "YES"), then the method 300 proceeds to step 318. In one embodiment, fewer bits within the redundant data of the image are modified in order to increase the perceptual quality of the content after modification and avoid perceptual quality degradation. At step 318, a determination is made as to whether there are more images to be processed. If, it is determined that there are more images to be processed (option "YES"), then the method 300 returns to step 306. If, at step 318 it is determined that no more images are to be processed then the method 300 proceeds to step 320. The method 300 ends at step 320.

While the foregoing is directed to embodiments of the present invention, other and further embodiments of the invention may be devised without departing from the basic scope thereof, and the scope thereof is determined by the claims that follow.

The invention claimed is:

1. A method for preventing data leakage caused by steganography without perceptual quality degradation, comprising:
processing content being transmitted from a computer, wherein the content comprises steganographic data; and
before the transmission, modifying the steganographic data to corrupt hidden information within the content without perceptual quality degradation, wherein modifying the steganographic data comprises accessing carrier modification information that indicates at least one acceptable perceptual quality for the content after modification, and wherein accessing the carrier modification information comprises establishing a peak signal to noise ratio (PSNR) value, wherein the peak signal to noise ratio (PSNR) value indicates a number of bits of redundant data within the content that is to be modified in order to corrupt the steganographic data without perceptual quality degradation.

2. The method of claim 1, wherein modifying the steganographic data further comprises:
modifying at least one bit of the steganographic data in accordance with the carrier modification information.

3. The method of claim 2, wherein the carrier modification information indicates at least one portion of the content that is modifiable without a loss in perceptual quality.

4. The method of claim 2, wherein the carrier modification information indicates at least one pixel in which at least one less significant bit is modifiable without perceptual quality degradation of an image.

5. The method of claim 2, wherein peak signal to noise ratio (PSNR) value is associated with modifying the steganographic data without perceptual quality degradation of the content.

6. The method of claim 5, wherein the peak signal to noise ratio value indicates an acceptable perceptual quality for the content after modification and a number of bits to modify, wherein the hidden information is corrupted without perceptual quality degradation.

7. The method of claim 5, wherein modifying the at least one bit further comprises determining the at least one bit based on the established PSNR value.

8. The method of claim 1 further comprising:
computing a PSNR value between the modified content and the content; and
comparing the PSNR value to carrier modification information to filter the modified content.

9. The method of claim 8 further comprising determining the perceptual quality degradation associated with the modified content based on the computed PSNR value.

10. The method of claim 1, wherein modifying the steganographic data further comprises modifying a number of redundant bits to corrupt the hidden information without perceptual quality degradation of the content.

11. An apparatus for preventing data leakage caused by steganography without perceptual quality degradation, comprising:
a memory comprising carrier modification information that is used to determine at least one bit of steganographic data to modify without perceptual quality degradation of content, wherein modifying the steganographic data comprises accessing carrier modification information that indicates at least one acceptable perceptual quality for the content after modification;
data leakage prevention software residing in a non-transitory computer-readable medium for modifying the at least one bit of the steganographic data based on the carrier modification information to corrupt hidden information within the content; and
a perceptual quality module for computing a peak signal to noise ratio (PSNR) value based on accessing the carrier modification information, wherein the peak signal to noise ratio (PSNR) value indicates a number of bits of redundant data within the content that is to be modified in order to corrupt the steganographic data without perceptual quality degradation.

12. The apparatus of claim 11 wherein the PSNR value indicates a perceptual quality of the content after the modification.

13. The apparatus of claim 12, wherein the perceptual quality module determines the perceptual quality degradation associated with the modified content.

14. The apparatus of claim 12, wherein the data leakage prevention software compares the computed PSNR value with the carrier modification information to filter the content.

15. The apparatus of claim 11, wherein the data leakage prevention software selects an acceptable perceptual quality for the content from the carrier modification information.

16. The apparatus of claim 11, wherein the data leakage prevention software determines the at least one bit of the steganographic data to modify based on an acceptable PSNR value for the content, wherein the acceptable PSNR value indicates an unnoticeable loss in perceptual quality of the content after modification.

17. A system for preventing data leakage caused by steganography without perceptual quality degradation, comprising:
  a user computer for transmitting content, wherein the content comprises steganographic data;
  a filter, comprising:
    data leakage prevention software residing in a non-transitory computer-readable medium for modifying the steganographic data before transmission of the content to corrupt hidden information within the steganographic data based on carrier modification information, wherein the carrier modification information indicates at least one bit of the steganographic data to modify without perceptual quality degradation of the content, wherein modifying the steganographic data comprises accessing carrier modification information that indicates at least one acceptable perceptual quality for the content after modification; and
  a perceptual quality module for computing a peak signal to noise ratio (PSNR) value based on accessing the carrier modification information, wherein the peak signal to noise ratio (PSNR) value indicates a number of bits of redundant data within the content that is to be modified in order to corrupt the steganographic data without perceptual quality degradation.

18. The system of claim 17 wherein the PSNR value indicates a perceptual quality of the content after modification of the steganographic data.

19. The system of claim 17, wherein the data leakage prevention software prevents transmission of the content based on the computed PSNR value.

20. The system of claim 17, wherein the data leakage prevention software determines the at least one bit of the steganographic data to modify based on an acceptable PSNR value for the content after modification.

* * * * *